United States Patent
Roberts

(10) Patent No.: US 7,126,918 B2
(45) Date of Patent: *Oct. 24, 2006

(54) MICRO-FLOW MANAGEMENT

(75) Inventor: Lawrence G. Roberts, Woodside, CA (US)

(73) Assignee: Caspian Networks, Inc., San Jose, CA (US)

( * ) Notice: Subject to any disclaimer, the term of this patent is extended or adjusted under 35 U.S.C. 154(b) by 846 days.

This patent is subject to a terminal disclaimer.

(21) Appl. No.: 10/086,763

(22) Filed: Feb. 27, 2002

(65) Prior Publication Data

US 2002/0080786 A1    Jun. 27, 2002

Related U.S. Application Data

(63) Continuation of application No. 09/552,278, filed on Apr. 19, 2000, now Pat. No. 6,574,195.

(51) Int. Cl.
*H04L 12/56* (2006.01)

(52) U.S. Cl. .................................. 370/235; 370/395.42

(58) Field of Classification Search ............... 370/401, 370/229, 230, 231, 232, 233, 234, 235, 237, 370/411, 412–418, 465, 351, 352, 444, 503, 370/345.1, 345.52, 345.61, 345.4, 345.41, 370/345.21, 345.2, 345.42, 345.32, 389
See application file for complete search history.

(56) References Cited

U.S. PATENT DOCUMENTS

| 5,014,265 | A | * | 5/1991 | Hahne et al. ............... 370/236 |
| 5,067,127 | A | * | 11/1991 | Ochiai ......................... 370/238 |
| 5,267,232 | A | | 11/1993 | Katsube et al. |
| 5,436,886 | A | | 7/1995 | McGill |
| 5,467,343 | A | | 11/1995 | Lee et al. |
| 5,559,611 | A | | 9/1996 | Bloomfield et al. |
| 5,909,440 | A | | 6/1999 | Ferguson et al. |
| 5,917,821 | A | | 6/1999 | Gobuyan et al. |
| 5,933,425 | A | | 8/1999 | Iwata |
| 5,995,503 | A | | 11/1999 | Crawley et al. |
| 6,006,264 | A | | 12/1999 | Colby et al. |
| 6,072,797 | A | | 6/2000 | Fletcher |
| 6,081,522 | A | | 6/2000 | Hendel et al. |
| 6,081,524 | A | | 6/2000 | Chase et al. |
| 6,195,697 | B1 | | 2/2001 | Bowman-Amuah |
| 6,249,519 | B1 | * | 6/2001 | Rangachar .................. 370/356 |
| 6,574,195 | B1 | * | 6/2003 | Roberts ....................... 370/235 |
| 6,801,502 | B1 | | 10/2004 | Rexford et al. |

OTHER PUBLICATIONS http:/164.195.100.11/netacig/nph-..'.WKU.&OS=PN/5701291& RS=PN/5701291; (U.S. Patent 5,701,291).

"NetFlow Services and Applications"; *White Paper*; Public Copyright © 1999 Cisco Systems, Inc.; pp. 1-27.

"PLURIS®"; *Scalable to the Core*; Teraplex™ 20—Product Overview; pp. 1-9.

(Continued)

*Primary Examiner*—Ajit Patel
(74) *Attorney, Agent, or Firm*—Fenwick & West LLP

(57) ABSTRACT

New switching technology relies upon state information for providing a previously unavailable degree of quality of service. In particular, by providing the ability to give service guarantees to uniquely identifiable sets of packets ("micro-flows"), different qualities of service can be offered for each transmission. The QoS associated with each micro-flow is characterized by a set of descriptors. These descriptors are communicated to each switch by the first packet of the micro-flow associated with the descriptors.

53 Claims, 9 Drawing Sheets

OTHER PUBLICATIONS

Tag Switching; Cisco IOS Technologies; http://www.cisco.com/warp/public/cc/cisco/mkt/ios/tag/index.shtml; Cisco Systems; Apr. 5, 2000; pp. 1-4.

Cisco—NetFlow Services and Applications; Netflow Services and Applications; wysiwyg://18http://www.cisco.com/warp/public/732/netflow/; Apr. 5, 2000 pp. 1-3.

FlowCollector Overview; http://www.cisco.com/univercd/cc/t.gmt/nfc/nfc_3_C/nfc_ug/nfcover.htm; Apr. 5, 2000 pp. 1-8.

"White Paper—The Need for QoS"; Stardust.com, Inc.; QoSforum.com; A White Paper; Jul. 1999; pp. 1-14.

"Requirements for Traffic Engineeing Over MPLS"; http://www.ietf.org/rfc/rfc2702.txt; Apr. 16, 2000; pp. 1-26.

"Specification of Quaranteed Quality of Service"; http://www.ietf.org/rfc/rfc2212.txt?number=2212; Apr. 16, 2000; pp. 1-10.

Resource ReSerVation Protocol (RSVP)—Version 1 Functional Specification; http://www.ietf.org/rfc/rfc2205.txt?number=2205; Apr. 16, 2000; pp. 1-97.

"An Architecture for Differentiated Services"; http://www.ietf.org/rfc/rfc2475.txt?number=2475; Apr. 16, 2000; pp. 1-32.

"Definition of the Differentiated Services Field (DS Field) in the lpv4 and lpv6 Headers"; http://www.ietf.org/rfc/rfc2474.txt?number=2474; Apr. 16, 2000; pp. 1-18.

"Quality of Service Protocols Use a Variety of Complementary Mechanisms to Enable Deterministic End-to-End Data Delivery," QoS Protocols & Architectures, QoS Forum White Paper, Stardust.com, Inc., pp. 1-25, Jul. 8, 1999.

* cited by examiner

MICRO-FLOW MANAGEMENT

CROSS REFERENCE TO RELATED APPLICATIONS

This application is a continuation of U.S. patent application Ser. No. 09/552,278, filed on Apr. 19, 2000 now U.S. Pat. No. 6,574,195, for which a Continued Prosecution Application was filed on Aug. 31, 2001, of which the contents of these applications are herein incorporated by reference.

BACKGROUND

1. Technical Field

This invention relates generally to the field of computer networks, and particularly to quality of service management of data transmitted over a computer network.

2. Background of the Present Invention

Currently, one of the fastest growing markets is the network services provider market, such as wide area network ("WAN") backbones and Internet core switch services, in which bandwidth needs are exploding. For network services providers to differentiate themselves from each other, value-added services, such as quality voice capability over a network, is a desirable service to offer. However, with such value-added services, even greater amount of bandwidth as well as a greater control over the network is needed.

Currently, network service providers rely upon conventional switches to connect dial-in port concentrators to the backbone of the network, such as the Internet, as well as to network computer servers. These servers and port concentrators typically communicate with each other through the use of the Internet protocol ("IP"). The port concentrators typically communicate with the backbone of the network through the use of the asynchronous transfer mode ("ATM") protocol. Due to the high bandwidth associated with ATM, ATM switches typically are the preferred type of switches for the network service provider's core network. In particular, this high bandwidth is due to the use in ATM of fast explicit rate ("ER") flow control, hard quality of service ("QoS"), good QoS routing and virtual circuit ("VC") switching. However, there are certain limitations that exist with ATM that discourage the future use of this protocol within higher capacity switches.

The primary problems with ATM switches are the fixed sizes of ATM cells, too many operating system interrupts that reduce peak speed, costly network interface card, a 20% "cell tax" overhead, signaling too slow for data (e.g., due to round trip path set-up and closure) and poor routing stability. For example, in ATM, VC technology typically is used to achieve bandwidth that is needed for voice and video data. In addition, VC technology is able to achieve better flow control and quality of service ("QoS") for data than a conventional IP-based system. The VC concept, which was developed by Dr. Lawrence Roberts for X.25, establishes a simple marked path through the network that not only greatly increases switching speed, but also creates a context for the QoS and flow control for each call transmission. Without VC-based ATM in a conventional system, it is nearly impossible to provide "hard QoS" or controlled delay variation that is required for toll quality two-way voice and video.

ER flow control is needed in ATM to stop the delay creep associated with world wide web access. However, ER flow control only is beneficial for switches that also have VC switching. Switches along a VC path, which are supporting ER flow control, mark small out of band packets to indicate the maximum rate that can be for sending data. The ATM switch needs the VC context to identify VC's and to mark the path back to the source. Fast signaled VC ATM-based switching can accomplish this transmission rate and still operate 20 times faster than a conventional IP packet switch. However, ER flow control is very difficult to design and to support the many to one joints in the VC mesh-type structure. This configuration typically requires approximately 100 times the processing time per packet that normal packet processing requires. Such requirements are infeasible with today's conventional high speed switches. Furthermore, the scalability of the VC ATM-based switch is limited by the number of VC's available in ATM. In particular, this characteristic limits the number of destinations ATM can set up. As the Internet grows, this limitation will create a serious limitation for ATM. Furthermore, without the capability to join together on a certain trunk VC's that are going toward the same destination, the size of a conventional network that can be supported is further severely limited. In addition, with regard to failure recovery, when a trunk or switch fails within a VC mesh, the routes must be rebuilt. If there are pre-formed alternate paths, the alternate routes also must be rebuilt. The time to rebuild depends upon the call setup rate of the switch technology and if that is not much faster than ATM call setup is today, the rebuild time can become excessive and intolerable in conventional networks. In addition, if the network 100 utilizes the synchronous optical network ("SONET") protocol, failure of a trunk line results in the need for all traffic to be redirected from that trunk, which typically results in a 50 millisecond outage.

Because of protocol complexity and because of the reliance upon software-implemented protocols for ATM switches, the signaling protocol is too slow and the virtual circuit ("VC") allocation is too low for conventional ATM switches to provide the necessary capacity for next generation services. In addition, with world wide web applications permeating all across the Internet and Intranets, the signaling rates and VC counts are becoming far too high for current conventional ATM switches to be useful. Thus, even though ATM's protocol stack is currently viewed as superior to other protocol stacks, such as IP, ATM is becoming limited because it cannot compete with IP in cost to the user and in signaling capacity on the network backbone for the network service provider.

To attempt to offer the robustness of ATM, but through the use of IP, alternative conventional protocols for IP have been proposed for offering a certain quality of service ("QoS"). In particular, the specific advantages associated with transmission control protocol ("TCP")/IP include the ability to have variable size packets, less operating systems interrupts, cheaper NICs, fast routing for data calls and packets can be efficiently transmitted over a trunk.

However, conventional networks 100 utilizing TCP/IP as illustrated in FIG. 9 are very slow due to TCP flow control, the lack of availability of standard or hard QoS, the lack of Qos routing and the limitations associated with analyzing each packet for routing purposes. In particular, since conventional networks 100 cannot route information based upon per-flow state information, conventional networks 100 are unable to route each flow on a path with sufficient capacity. Rather, as illustrated in FIG. 1A, a conventional network 100 focuses upon total capacity available and not on the availability of guaranteed rate ("GR") capacity. In particular, a conventional network 100 selects the shortest path for a group of micro-flows ("composite flow") and transmits that composite flow entirely over that designated path. This technique typically leads to the overloading of a specific trunk line, thereby making QoS very difficult to implement. Without state information, a switch cannot identify which path each micro-flow should be sent over. This limitation prevents the switch from splitting the composite flow into smaller micro-flows that can be routed over specific routes that have available capacity.

Without the ability to avoid having to rely upon composite flows, the network 100 is unable to route these micro-flows in the most efficient manner over the network 100. For example, if a trunk line on the network 100 was not able to manage the additional capacity associated with a composite flow (e.g., composite flow (A+B)), that composite flow would have to be rerouted onto another trunk line. Because the composite flow could not be resized, composite flow (A+B) could only be rerouted onto a trunk with at least the capacity needed for this composite flow. Any trunk lines that have less than the capacity needed for composite flow (A+B) would remain unused.

If all paths within a network 100 were fully loaded, conventional networks 100 also cannot discard packets from a specific micro-flow, thereby limiting the efficiency of the network 100. Discarding correctly is an important component for achieving efficient QoS for data transmissions. Internet users (e.g., users of user datagram protocol ("UDP") and TCP) will send information as fast as possible since there is no traffic control except for packet loss. These applications, therefore, quickly can fill all of the buffers on a conventional network 100. As illustrated in FIG. 9, random early discards ("RED"), which are proportional to the buffer fill, can save the switch from becoming overloaded, but unfortunately results in wreaking havoc on the QoS of the transmission. Without the capability of intelligent discarding, true QoS cannot be achieved.

For example, for TCP, a conventional network 100 cannot avoid discarding before the user is up to the available rate. For UDP, a conventional system cannot discard even though the stream is at an acceptable rate. Without state information per micro-flow, the network 100 cannot determine the rate of each flow and thus optimize the discards. Without state information, if a source (e.g., computer system 110B) is misbehaving by sending data too fast, a conventional network 100 also cannot discard a packet associating with these data transmissions to ensure buffer space is available for those sources (e.g., computer system 110A) that are behaving. Therefore, the switch cannot punish the misbehaving source, which thereby results in all flows suffering degradation as a result of the misbehaving source.

Several conventional protocols have been proposed to attempt to address these limitations with regard to achieving QoS in an IP network. Resource reservation protocol ("RSVP"), which is described within the Internet Engineering Task Force ("IETF")'s Request for Comments ("RFC") for "Resource ReSerVation Protocol (RSVP)—Version 1 Functional Specification" ("RFC 2205") and "Specification of Guaranteed Quality of Service" ("RFC 2212") was intended to allow a flow to signal its requirements. However, the complexity and processing time involved with RSVP negotiation makes RSVP as poor as ATM for flow setup.

Differentiated Services ("DiffServ") is an alternative technique to RSVP, which utilizes 6 Diffserv bits in the IP header to indicate one of several limited QoS classes. In particular, as discussed in the IETF's "Definition of the Differentiated Services Field (DS Field) in the IPv4 and IPv6 Headers" ("RFC 2474") and "An Architecture for Differentiated Services" ("RFC 2475"), DiffServ is intended to allow network service providers to offer to each network user a range of network services which are differentiated on the basis of performance. In such a scheme, by marking a specific field (e.g. the DS field) of each packet with a specific value, a user can request on a packet by packet basis a specific limited performance class level. This value would specify the per-hop behavior to be allotted to that packet within the provider's network.

Typically, the user and network provider would negotiate a profile (e.g. policing profile) that describes the rate at which traffic can be submitted at each service class level. Packets submitted in excess of this profile would not be allotted the service class level requested. An important feature of DiffServ is viewed to be its scalability, which allows the protocol to be deployed in very large networks. This scalability is achieved by forcing as much complexity out of the core of the network and into the boundary devices that process lower volumes of traffic and lesser numbers of flows.

However, this protocol has significant limits that preclude DiffServ from providing an effective solution to the problems faced with implementing QoS in an IP network. For example, DiffServ is a traffic classification technique that only has 6 bits with a total of only 13 general service classes defined. Four classes are reserved for assured service. One class is reserved for expedited service. There, however, are no QoS definitions to quantify each class, which thereby limits the QoS types that can be supported. Since the Internet will need to be able to carry a wide variety of QoS types, this quantification limitation greatly restricts the future use of DiffServ-based QoS in large networks. By oversimplifying the QoS characterization problem by relying upon simple non-quantified classes, the overall effectiveness of such QoS in IP has been minimized.

DiffServ in the IP context also does not allow each packet to be routed with state information associated with each packet. Only one route is allowed by the border gateway protocol ("BGP") and the routing protocols. As illustrated in FIG. 1B, DiffServ allows micro-flows to be grouped by DiffServ classes and routed together as part of a composite flow. However, such composite flows may far exceed the routing path's capacity. In addition, without state information, multiple routes cannot be used because of packet ordering problems. With no state information and only DiffServ bits, the best that a conventional switch can do is to set up multiple queues, each receiving all of the packets of a specific QoS class. Within such a queue, there would be no way to avoid head-of-line blocking. Since the queues do not correspond to single micro-flows, weighted fair queuing ("WFQ") cannot achieve an improvement in such factors as delay variation. Instead, WFQ in this context would result in further delaying traffic. Priority queuing, which allows low delay variance traffic to be transmitted first and high delay variance traffic to be transmitted later, is the best that can be done without using state information. However, if one source (e.g., computer system 110C) is transmitting at a much higher rate, this scheme causes major problems with regard to the ability to route the higher delay variance traffic. Without keeping per micro-flow state information, WFQ techniques cannot minimize delay variation and cannot provide correction to the agreed rate at each switch. Thus, delay variance cannot be kept constant and cannot be prevented from cumulating across the network. In such a conventional network 100, delay variation, therefore, would not be able to be made extremely small, which is needed characteristic for voice interconnecting to an analog phone or for moving pictures expert group—extension 2 ("MPEG-2") video.

The IETF has proposed an alternative conventional protocol, within RFC 2702, entitled "Requirements for Traffic Engineering Over Multi Protocol Label Switching ("MPLS")." MPLS utilizes a routing approach whereby the normal mode of operation is that the operator of the network explicitly sets up MPLS composite flows on a static basis across the network 100. Each MPLS composite flow also is manually assigned a QoS by the operator.

MPLS provides a simple "core" set of mechanisms which can be applied in several ways to provide a rich functionality. Since MPLS defines an architecture and protocol for encapsulating IP traffic in new routing headers, it involves a much more extensive change to conventional IP networks than Diffserv which is exclusively focused on existing routing-independent IP packet fields. The MPLS approach to indicating IP QoS parameters is different from the approach defined in Diffserv. In particular, the MPLS label is intended to improve efficiency and control of the switch network and allow switches to forward packets using predetermined paths according to, among other things, specified QoS levels.

The disadvantage of this protocol, however, like DiffServ, is that the switch can only identify a small set of "standard" QoS patterns, thereby greatly restricting the future services available to a network 100 that requires a wide variety of QoS types to be used. Furthermore, even though MPLS allows multiple composite flows on multiple routes, there still are restrictions on multiple paths. In addition, micro-flows still must be grouped into composite flows. In particular, like DiffServ and as illustrated in FIG. 1B, MPLS only can group by pre-determined packet classifications. Therefore, like DiffServ, when a path becomes overloaded, there is no way to reject new micro-flows or to split the composite flow into micro-flows and use alternative routes. Instead, MPLS can only drop random packets.

Accordingly, what is needed is a system and method for improving the quality of service in data transmissions by relying upon per micro-flow state information that enables rate and delay variation requirements to be within a certain quantified level of service.

SUMMARY OF THE PRESENT INVENTION

The present invention provides networks with an improved quality of service ("QoS") based upon per-flow state information. By providing the ability to associate specific state information to a uniquely identifiable set of data signals that typically have the same open system interconnection model network layer and transport layer characteristics ("micro-flow"), a specific, quantified level of QoS can be associated with that micro-flow.

In particular, the QoS associated with each micro-flow can be characterized by state information that is in the form of a set of quantified QoS descriptors. Each set of descriptors that is specific to a unique micro-flow is stored within a flow block table within each switch. The QoS descriptors are communicated from one switch to another switch via a QoS field that is embedded within the first micro-flow data signal of each micro-flow.

Based upon these descriptors, the characteristics of a specific micro-flow can be quantified and used to efficiently route the data signals associated with that micro-flow through a network within certain QoS constraints, such as within a certain guaranteed rate and delay variation.

DETAILED DESCRIPTION OF EMBODIMENTS OF THE PRESENT INVENTION

Embodiments of the present invention are now described with reference to the figures where like reference numbers indicate identical or functionally similar elements. In addition, the term switch will be used as synonymous with router. In particular, it should be noted that the reference to a switch is intended to merely refer to any type of device that assists in the transporting of data signals from one point in a network to another point in the network.

Figure 2:
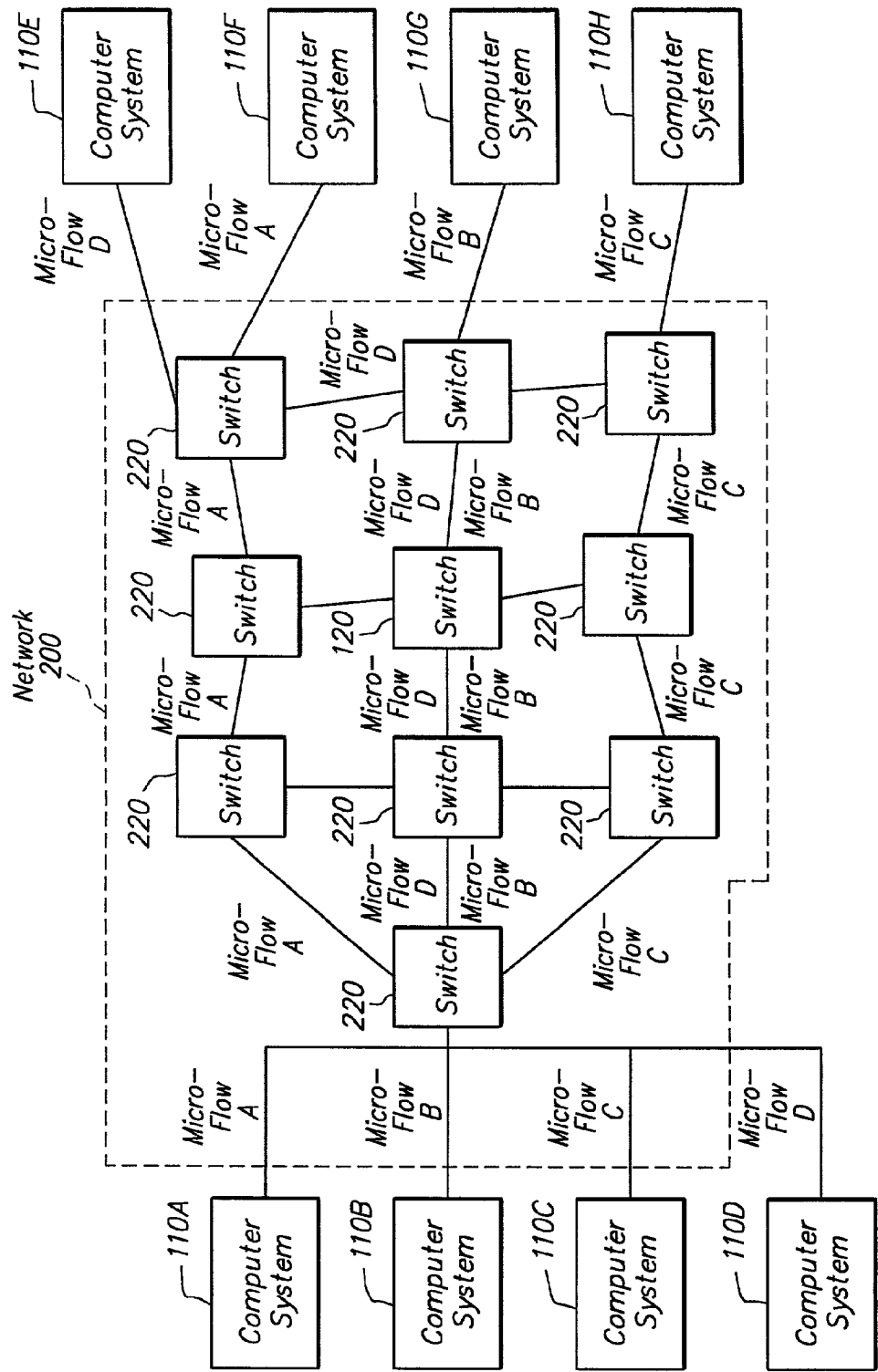
FIG. 2 illustrates a network of an embodiment of the present invention that routes micro-flows.

FIG. 2 illustrates a high level block diagram of a state-based micro-flow network 200 of an embodiment of the present invention. For illustrative purposes only, the remaining discussion of network 200 will be focused toward an IP (e.g., IPv4 or IPv6) data packet network. It should be noted, however, that alternative embodiments of the network 200 can operate with any type of data signal traffic that can be characterized as a micro-flow data signal including MPLS-based data signals, ATM cell data signals, frame relay frame data signals or Ethernet data signals.

In one embodiment of the present invention, network 200 relies upon per flow state information including QoS and routing information that allows the network 200 to route IP data packets within specific QoS constraints over the network 200 for a specific group of data packets (e.g., micro-flow A) between a source (e.g., computer system 110A) and a destination (e.g., computer system 110F). In particular, based upon the per flow state-based QoS information, the network 200 is able to attain efficient signaling (routing) and queuing for each micro-flow, thereby ensuring that certain QoS guarantees, such as guaranteed rate ("GR") and guaranteed maximum delay variation ("DV") can be maintained. Such QoS guarantees are possible because each switch 220 in the network 200 can monitor available bandwidth on the trunks coupled to each switch 220 and thereby manage each micro-flow on an individual basis to ensure that each micro-flow is routed in a manner that ensures the desired QoS constraints are satisfied.

Figure 1A:
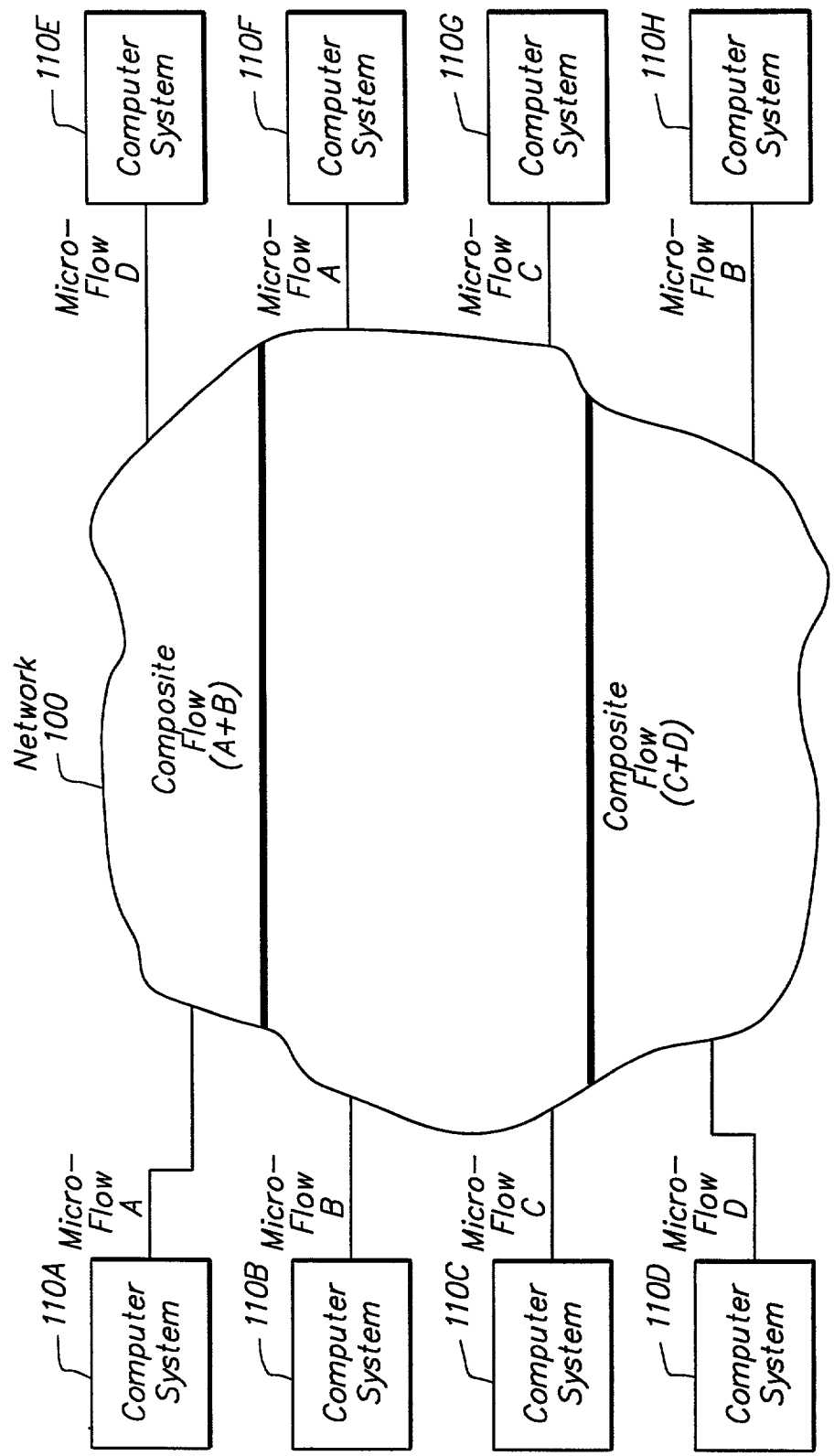
FIG. 1A illustrates a conventional network that routes composite flows.
Figure 1B:
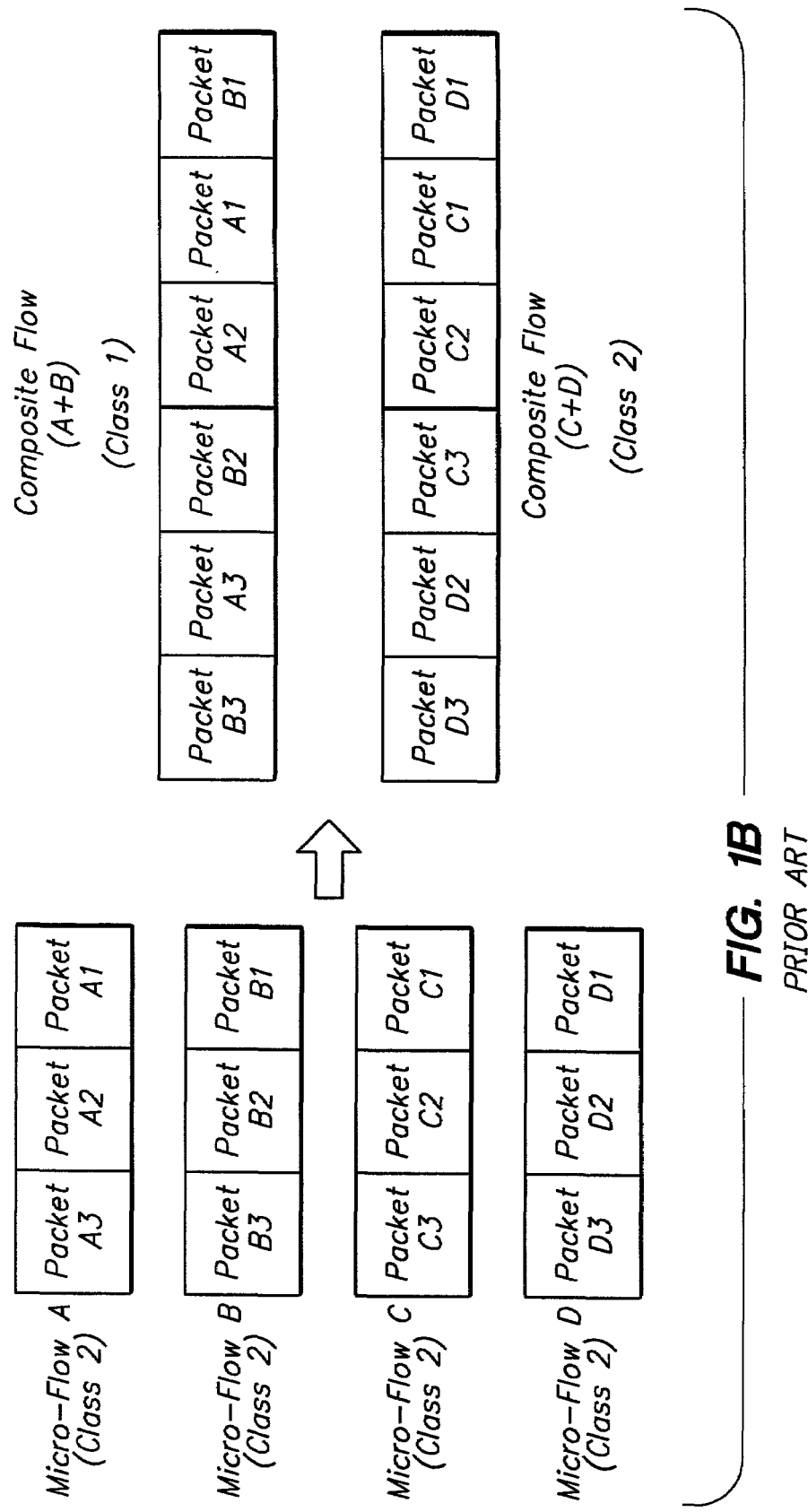
FIG. 1B illustrates composite flows that are forwarded over a conventional network.

Unlike with conventional composite flows as illustrated in FIG. 1A, the network 200 of an embodiment of the present invention, as illustrated in FIG. 2, can rely upon the use of micro-flows to finely tune the bandwidth usage of the various trunk lines within the network 200. For example, since the micro-flow is a single group of IP data packets from a single data transmission, the micro-flow has a smaller bandwidth than a typical composite flow. This smaller bandwidth characteristic allows each switch 220 in the network 200 to more easily route the micro-flow onto the most efficient trunk line (e.g., the trunk line that is part of the shortest route from the source to the destination) without having to be as constrained by limited bandwidth requirements. Previously, a network 100 was unable to route a composite flow over certain routes where bandwidth was limited because, due to the higher bandwidth requirements of a composite flow, switches were unable to reduce the size of the composite flows to compensate for the limited bandwidth trunk lines. The switches instead were faced with having to reroute the entire composite flow over a less efficient route, thereby impacting the ultimate QoS of all of the micro-flows within that composite flow.

For example, in FIG. 1A, micro-flows A and B, which were part of the same class (e.g., a DiffServ or MPLS class), must be bundled together into composite flow (A+B). This composite flow then must be routed across the network 100 as a single composite flow. Once the composite flow reaches its destination, each micro-flow (e.g., micro-flow A and micro-flow B) then is stripped out of the composite flow and routed to its final destinations (e.g., computer systems 110F and 110H, respectively). With regard to micro-flows C and D, which are part of a different class of service, these micro-flows also must be bundled together into a composite flow (e.g., composite flow (C+D)). Like composite flow (A+B), composite flow (C+D) then must be routed across the network 100 as a single flow. Based upon this limited routing scheme, network 100 has certain trunk lines that are under-utilized. In addition, if one of the utilized trunk lines fails, the entire composite flow then must be diverted onto a single alternative trunk line. Such redirecting of composite flows becomes more and more difficult as the capacity within the network 100 becomes less and less available. At some point, the network 100 may have problems routing as well as diverting composite flows onto alternative trunk lines because of the large size of composite flows and the limited available bandwidth on a trunk line. Hence, either the trunk line of a conventional network 100 must be allowed to maintain a certain level of available unused bandwidth for such an emergency or there exists a possibility that a composite flow that is on a trunk line that fails may not be able to ensure that the micro-flows within that composite flow will reach its destination within certain QoS constraints.

FIG. 2 illustrates the network 200 of an embodiment of the present invention where each micro-flow can be separately routed across the network 200. In particular, each micro-flow can have its own specific QoS characteristics and, unlike conventional networks 100, is not treated as a specific class of service that can only have a specific QoS class characteristic.

With the switches 220 of network 200 now able to separately route each micro-flow with its smaller bandwidth requirements and its quantified QoS characteristics, the switches 220 have a greater opportunity to be able to route any specific micro-flow on any specific trunk line, even a trunk line that currently is close to its maximum bandwidth capacity. By limiting the need to reroute specific micro-flows that have a stringent QoS, micro-flows that previously would have faced an undue delay because of having to be rerouted within a composite flow, now can be separately routed on the most direct available trunk line to ensure that the QoS associated with that specific micro-flow is attained. In addition, by having the ability to route each micro-flow separately, the network 200 now can ensure the strict compliance of the QoS constraints for the micro-flows, while at the same time load balancing the trunk lines over the entire network 200 to ensure full utilization of the bandwidth of the entire network 200. With such an ability to load balance, the bandwidth capacity of trunk lines can be more easily and efficiently managed to ensure that the maximum bandwidth capacity of the entire network 200 is optimized while at the same time ensuring that each micro-flow is routed within its QoS constraints.

Figure 3A:
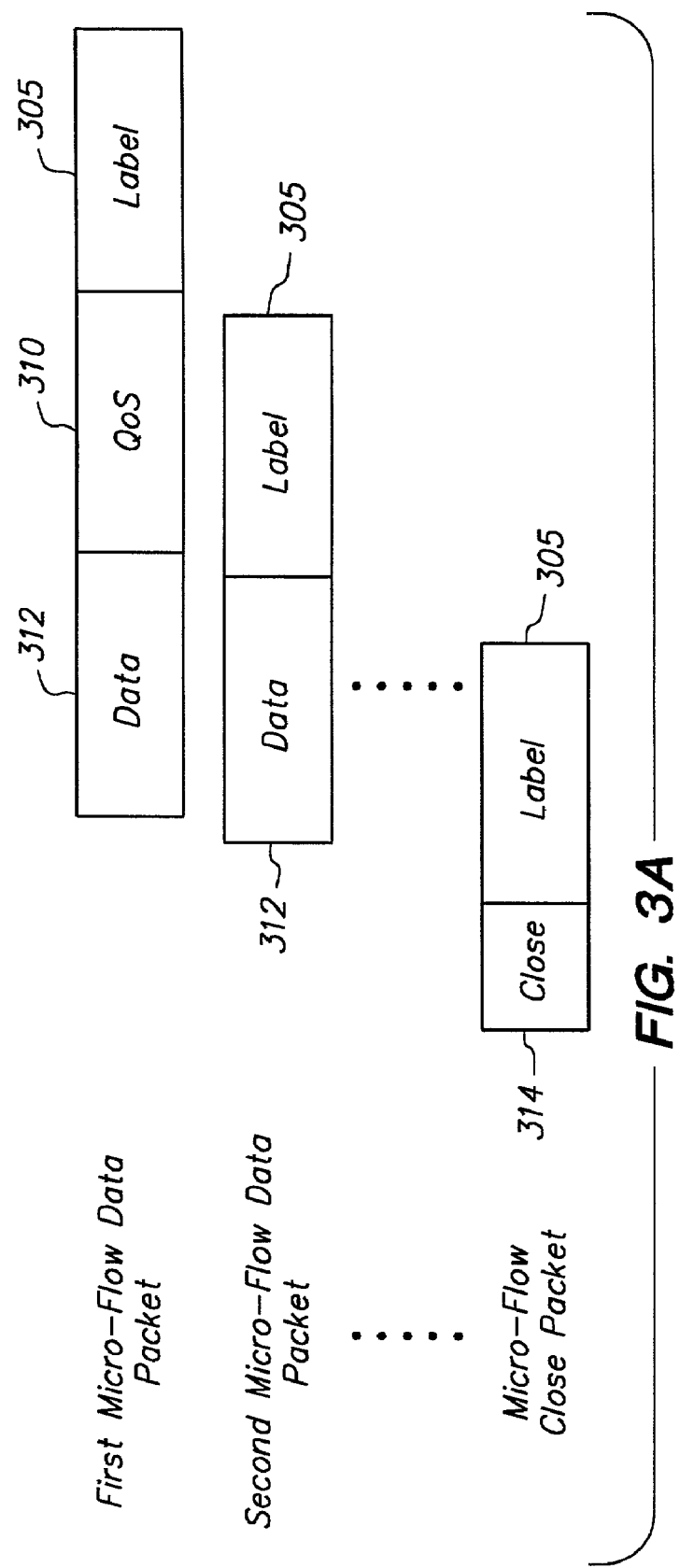
FIG. 3A illustrates micro-flow data packets of an embodiment of the present invention.

FIG. 3A illustrates a micro-flow of one embodiment of the present invention. The micro-flow typically is a group of IP data packets including a first micro-flow data packet, at least one additional micro-flow data packet and a micro-flow close packet. The first micro-flow data packet includes a label field 305, a QoS field 310 and a data field 312. The additional micro-flow data packets include the label field 305 and the data field 312, but not the QoS field 310. The micro-flow close packet includes the label field 305 and a close field 314. The close field 314 is used to instruct a switch 220 to terminate an already established micro-flow that is present in the network 200.

The data field 312 can include a portion of or the entire content of the received data packet. This content can include a header (e.g., an IP header information) and data information associated with the received data packet. The label field 305 is responsible for enabling the network 200 to differentiate the data packets of one micro-flow from the data packets of another micro-flow. In addition, the label field 305 is responsible for associating each micro-flow data packet with quantified QoS characteristics. This label field 305 specifically can represent a uniquely identifiable set of variables relating to the OSI model network layer (e.g., IPv4, IPv6) and transport layer (e.g., TCP, UDP) characteristics of the data packets of a single micro-flow. In one embodiment, the variables that are used to uniquely identify one micro-flow from another includes the protocol type, the source address, the destination address, the TCP/UDP source port number and the TCP/UDP destination port number associated with each data packet of the micro-flow. It should be noted that depending upon the type of data packet that is received by a switch 220, the information that is used to differentiate data packets of one micro-flow from another can be other types of information, such as the real time protocol ("RTP") type, MPLS or DiffServ identifiers, other information relating to a characteristic that is unique to the data packets of a specific micro-flow or a combination of this information.

Figure 3B:
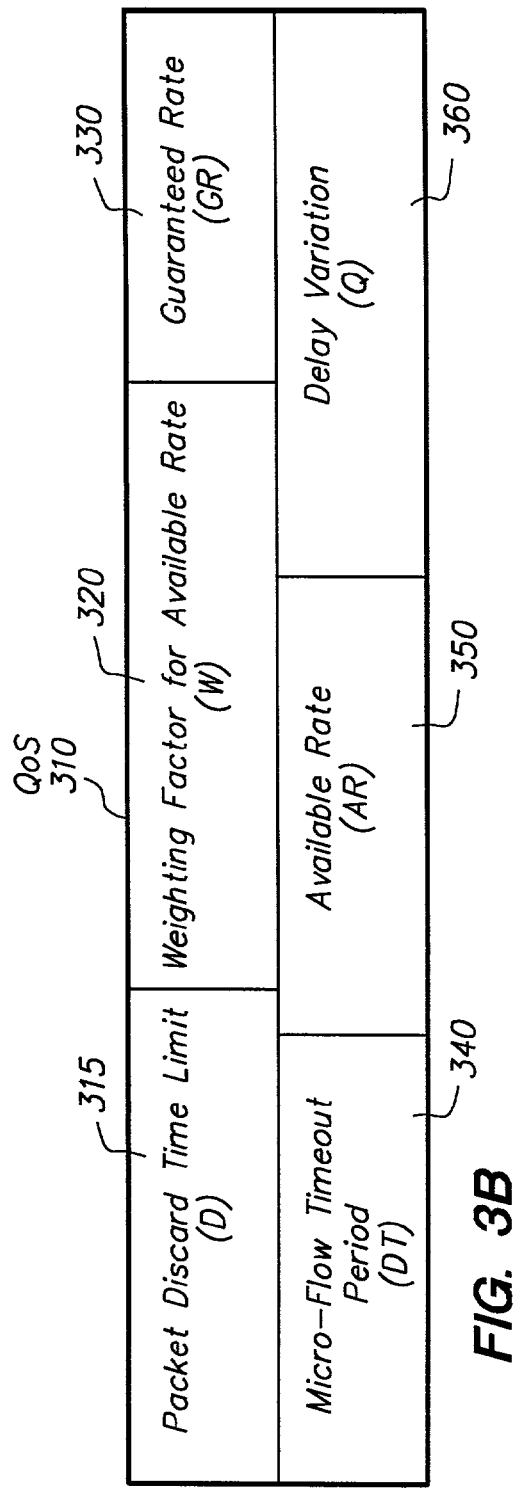
FIG. 3B illustrates a more detailed illustration of a QoS field within a first data packet of a micro-flow of an embodiment of the present invention.

As illustrated in FIG. 3B, the QoS field 310 for each micro-flow of one embodiment of the present invention is characterized by a set of QoS descriptors that describe such QoS constraints as the guaranteed rate and the guaranteed maximum delay for the micro-flow. In particular, the QoS field 310 can include QoS descriptors, such as the packet discard time limit ("D") value 315, a weighting factor for the available rate ("W") 320, a guaranteed rate ("GR") value 330, a micro-flow timeout period ("DT") value 340, an available rate ("AR") value and a delay variation value ("Q"). Based upon these QoS descriptors, the behavior of the micro-flow can be characterized as one of three types of service, available rate ("AR") traffic, maximum rate ("MR") traffic or guaranteed rate ("GR") traffic.

AR traffic, such as TCP-type micro-flows, typically does not have real-time requirements associated with the micro-flow due to the connection-oriented nature of this traffic on the transport layer. This type of traffic, therefore, has very loose delay variation and jitter characteristics as well as relatively relaxed discard (loss) prerequisites. MR traffic, such as a UDP micro-flow, has real-time characteristics (e.g., a real-time protocol that carries voice or video) that require more rigid delay variation and jitter requirements as well as is more sensitive to traffic loss. Since the desirable rate for this type of traffic typically cannot be deduced by just observing the IP packet's network layer and transport layer characteristics, the QoS characteristics assigned to these micro-flows further can be derived by the data packet's arrival rate into the switch 220. To determine this rate, the time difference between packets must be measured and this difference divided into the byte count of the packet. GR traffic is similar to MR traffic with regard to its characteristics. GR traffic, like MR traffic, has strict requirements on delay variation, jitter, and traffic loss characteristics. However, the rate of GR traffic that is desired by a user is communicated to the network 200 ahead of time by either explicit signaling (e.g., ATM/Frame Relay signaling or RSVP INTSERV), by examining the RTP protocol type or by user-defined traffic profiles (e.g., policy rules). It, however, should be noted that this reference to three classes of service is unlike MPLS or DiffServ classes of a conventional network 100. Instead, the three classes of service, AR traffic, GR traffic and MR traffic, are merely coarse characterizations of quantified state information that is associated with these different types of transmissions. Within each of these types of classes of service, micro-flows have numerous more finely differentiated QoS constraints including differences in delay variation and rate characteristics The guaranteed rate ("GR") value 330 allows a micro-flow to be guaranteed a specific rate. In one embodiment the GR value 330 is a 10 bit floating point number with the first 5 bits being the exponent ("E") and the second 5 bits being the mantissa ("M"). The GR value 330, therefore, would be equal to $(1+M/32)*2^E$ which can be dynamically adjusted. For AR traffic and MR traffic, the GR value 330 typically is set to zero. For GR traffic, the GR value typically is set to a predetermined value (e.g., from a policy rule) for that particular guaranteed rate micro-flow.

The packet discard time limit ("D") value 315 is used to ensure buffer availability within the switch 220. This value is a parameter that can operate like a burst tolerance that allows the switches 220 of the network 200 to have a basis for policing micro-flows. In one embodiment, the packet discard time can be between 10 ms and 500 ms. For AR traffic (e.g. TCP traffic where bursty applications, such as FTP, have network round trip times typically around 250 ms.), this parameter typically is set to a larger value (e.g., 400 ms). For MR traffic (e.g., UDP traffic carrying real-time voice or video using RTP) and for GR traffic (e.g., real-time voice or video), the D value 315 typically is set to approximately 50 ms.

The micro-flow timeout period ("DT") value 340 is used to ensure that a certain micro-flow is terminated after a certain period of time. In particular, this value 340 ensures that if the close packet associated with a micro-flow is lost in transit within the network 200, the switches 220 of the network 200 still can terminate a micro-flow after a certain amount of time. In one embodiment, the DT value 340 can be a value ranging between 0 and 32 seconds. For MR traffic (e.g. UDP traffic carrying real-time voice or video using RTP) and GR traffic (e.g., real-time voice or video), the DT value 340 typically is set to zero because of the long time period of the micro-flow. When the packets are associated with a continuous signal, such as time division multiplexed ("TDM") voice, the DT value 340 typically is set to a low value (e.g., 2 seconds). When there is a need for the micro-flow to not be discarded (e.g., typical of PVC's and ATM connections) the DT value 340 typically is set to a relatively large value.

The available rate ("AR") value 350 initially is assigned based upon the classification of the micro-flow and the assignment of specific QoS criteria. This field also typically is calculated differently depending on the traffic type (e.g. AR traffic, MR traffic or GR traffic) to which the micro-flow belongs. In particular, when receiving a new data packet that is the first data packet of a (new) micro-flow, the AR value 350 typically can be calculated as the available rate per flow value that has been transmitted to the ingress linecard 410 by the other linecards 410 within the switch 220.

The weighting factor ("W") value 320 for AR traffic indicates how much of a portion of an AR rate a micro-flow is able to be delegated as compared to other micro-flows. In one embodiment, the W value 320 is linear with zero meaning that the flow has no AR, such as is the situation with a constant bit rate ("CBR") flow from a received ATM cell. This W value 320 typically is dynamically set according to pre-existing resource allocation on the switch 220. The W value 320, therefore, can permit the network 200 to offer faster service for micro-flows associated with users, who are willing to pay more for more bandwidth. In addition, for AR traffic, the W value 320 can be dynamically set according to pre-existing resource allocation on the egress linecards. For MR and GR traffic, the W value can be set to zero. For MR traffic, AR, therefore, is set to a higher value. For GR traffic, AR typically can be set to a pre-determined GR value 330 plus a percentage of any available capacity unreserved on the egress trunk for which the data packet is destined. For AR traffic, the AR value 350 is calculated based upon ARPW*W, where ARPW represents the AR value per micro-flow for a specific egress linecard.

The delay variation ("Q") value 315 which in one embodiment can be between approximately 1 ms and 200 ms. For AR traffic, this parameter can be set to a large value (e.g., 100 ms). For MR traffic (e.g. UDP traffic carrying real-time voice or video using real-time transport protocol ("RTP")) or GR traffic (e.g. real-time voice or video), this parameter can be set to a smaller value (e.g., 1 through 10 ms).

By utilizing these per flow state-based QoS descriptors, each switch 220 within the network 200 can rely upon a queuing technique, such as weighted fair queuing ("WFQ"), to adjust the transmission rate of each micro-flow as needed to ensure that the QoS of each micro-flow is achieved. The switch 220, thus can ensure that the delay variation is small for micro-flows, such as analog-type phone calls (e.g., 5 ms) or for MPEG-2 video transmissions (e.g., 1 ms). The switch 220 further is able to ensure that the QoS of each micro-flow is achieved by determining effective routing for each the micro-flow based upon the state-based QoS information associated with that micro-flow. In particular, the switch 220 is able to support multiple near-equal routes that have available capacity (e.g. guaranteed rate capacity available for routing UDP and non-guaranteed capacity available for routing TCP) and assign state information relating to these route to each micro-flow. Such per micro-flow state-based QoS descriptors allows the switch 220 to spread the micro-flows across the entire available capacity within the switch 220 as well as across the network 200 and still maintain the QoS for each micro-flow. For example, for those micro-flows that have very strict delay and rate QoS constraints, the shortest route is emphasized in the routing by the switch 220. For those micro-flows that have less strict delay and rate QoS constraints, a less direct route can be used to utilize the less used bandwidth within the switch 220 and on the network 200. Such a ability to load balance the network 200 ensures that bandwidth will be available for those micro-flows with stricter delay and rate QoS constraints that require more direct paths to their destination.

To ensure that micro-flows that no longer are being transmitted across the network 200 are removed from each switch 220, either a "close" packet with a label corresponding to that specific micro-flow is received by each switch 220 or each switch 220 times out the micro-flow based upon the DT value 340 associated with that micro-flow.

Figure 4:
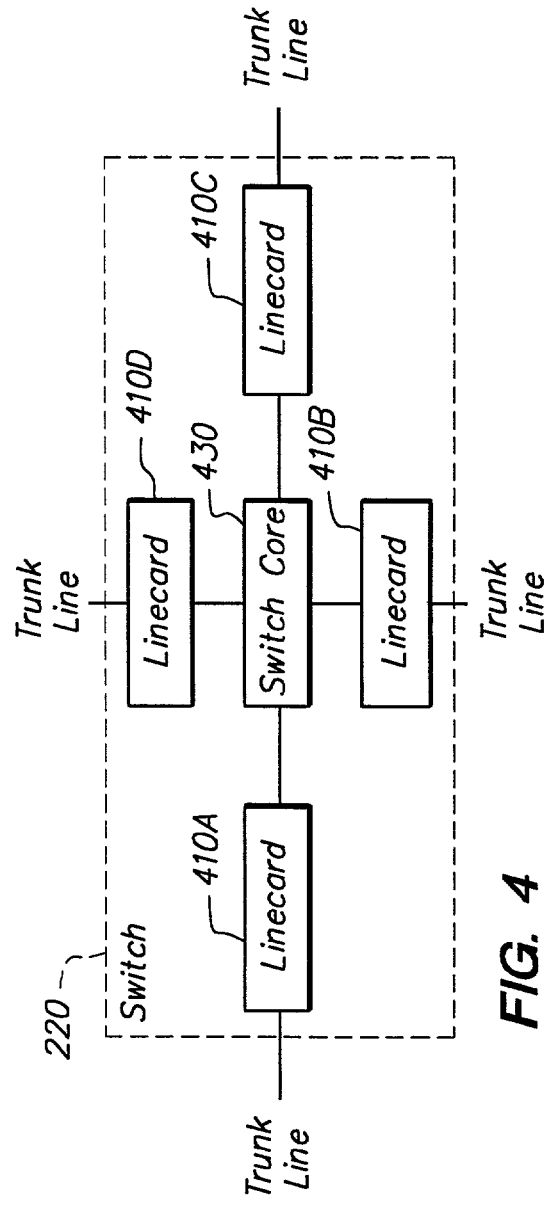
FIG. 4 illustrates a micro-flow switch of an embodiment of the present invention.

FIG. 4 illustrates a high level block diagram of a switch 220 within network 200 of an embodiment of the present invention. The switch 220 includes a plurality of linecards 410 and a switch core 430. The linecards 410 which are coupled between the switch core 430 and the trunk lines, are responsible for processing data packets received either from the trunk lines or from the switch core 430. The switch core 430 operates as the switching fabric for the switch 220. The ingress linecard 410 (e.g., linecard 410A) is responsible for receiving data packets from the trunk line, determining the QoS characteristics as well as the internal path from the ingress linecard 410 (e.g., linecard 410A) to the egress linecard 410 (e.g., linecard 410C) for each micro-flow and forwarding based upon the determined QoS information those data packets across the fabric of the switch core 430. Unlike conventional networks 100, the ingress linecard 410A merely needs to determine the QoS characteristics of a micro-flow once based upon information extracted from the first data packet of that micro-flow. Every other data packet received from this same micro-flow does not have its QoS characteristics or path information redetermined, but rather merely has the same QoS characteristics looked up and associated with these subsequent data packets. The ingress linecard 410A also utilizes the GR, AR and W values to ensure that no micro-flow is exceeding the rate assigned to that micro-flow. Should the data packet associated with that micro-flow be found to be exceeding its assigned rate, the data packet is discarded by the micro-flow. Should the data packet associated with a micro-flow be determined to be within its QoS constraints, the ingress linecard 410A transmits the micro-flow data packets over the fabric of the switch core 430 to the egress linecard 410C associated with the micro-flow.

The egress linecard 410C is responsible for receiving the data packet from the fabric of the switch core 430, determining the QoS characteristics and best route over the network 200 for the first data packet of each micro-flow and forwarding each data packet associated with that micro-flow onto the trunk line and across the specifically defined route on the network 200. The egress linecard 410C is responsible for ensuring that the micro-flow data packets are transmitted over the trunk line coupled to the egress linecard 410C within the QoS constraints assigned to the micro-flow. Unlike the ingress linecard 410A, which is more concerned with ensuring that the data packets do not exceed its assigned rate, the egress linecard 410C ensures that the micro-flow data packets are transmitted within the QoS constraints including its guaranteed rate and maximum delay variation.

It should be noted that the configuration of the switch 220 as illustrated in FIG. 4 can be modified in many different ways. For example, portions of the switch core 430 can be relocated onto each of the linecards 410 within the switch 220, thereby eliminating the need for a separate switch core 430 for the switching fabric. In addition, even though only one output port to a trunk line is illustrated for each linecard, it should be noted that multiple output ports can be including within each linecard 410, thereby allowing each linecard to be connected to multiple trunk lines. In one embodiment, the output port(s) on the linecard 410 can be optical carrier ("OC-") 3, OC-12 OC-48 or OC-192 ports.

Figure 5:
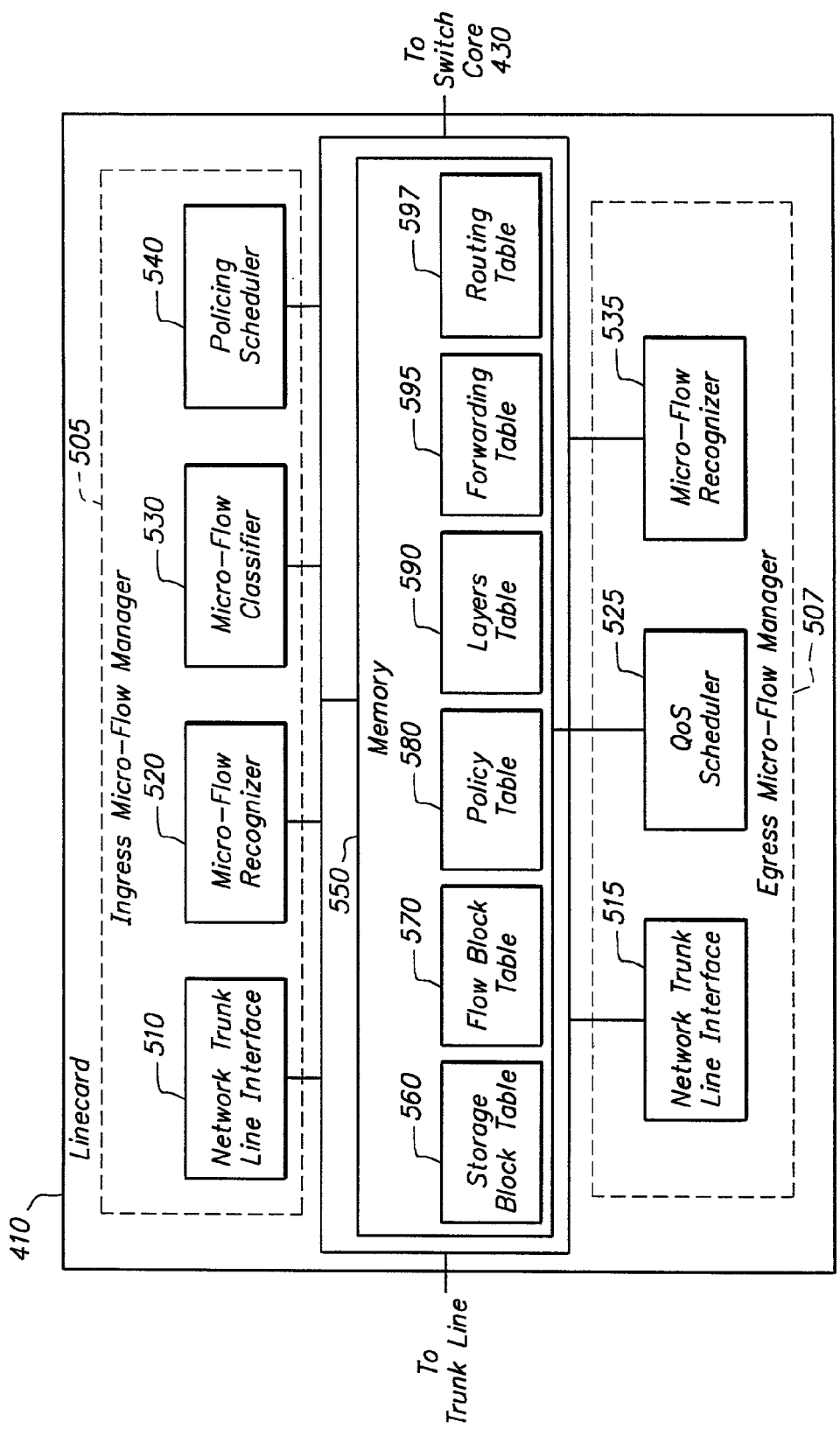
FIG. 5 illustrates a micro-flow linecard of an embodiment of the present invention.
Figure 6:
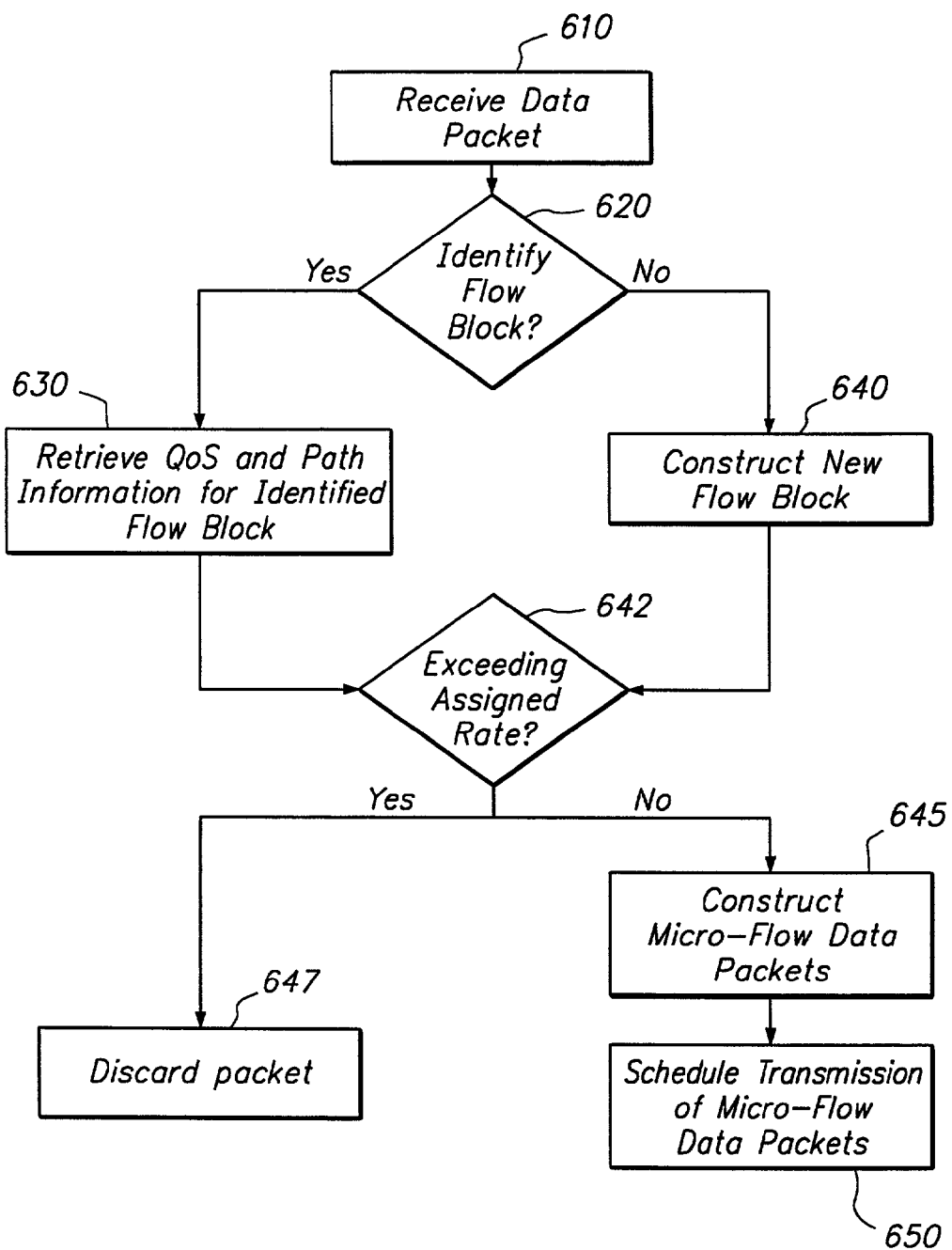
FIG. 6 illustrates a high level flow diagram of a method of an embodiment of the present invention for identifying a flow block corresponding to a received data packet.

FIG. 5 illustrates a more detailed high level block diagram of a linecard 410 of the switch 220 of an embodiment of the present invention. Each linecard 410 includes an ingress micro-flow manager 505, an egress micro-flow manager 507 and a memory 550. The ingress micro-flow manager 505 includes a network trunk line interface 510, a micro-flow recognizer 520, a micro-flow classifier 530 and a policing scheduler 540. The egress micro-flow manager 507 includes a micro-flow recognizer 535, a QoS scheduler 525 and a network trunk line interface 515. The memory 550 includes a storage block table 560, a flow block table 570, a policy table 580, a layers table 590, a forwarding table 595 and a routing table 597. It should be noted that for illustrative purposes only, one output port (not illustrated) is discussed as being connected to the trunk line. However, in alternative embodiments, a plurality of output ports on each linecard 410 can enable the linecard 410 to be coupled to a plurality of trunk lines.

The network trunk line interface 510 which is coupled to the trunk line, the micro-flow recognizer 520 and the memory 550, is responsible for receiving 610 data packets from the trunk, deencapsulating (if needed) the data packets and storing the data packets within storage blocks within the storage block table 560. In one embodiment of the present invention, the network trunk line interface 510 can deencapsulate various types of data packets including micro-flows having different physical layers (e.g., SONET or Gigabit Ethernet) as well as various link layers (e.g., MPLS, IPv4, IPv6 or ATM). Once the network trunk line interface 510 has stored the data packets within the storage block table 560, pointers to those storage blocks are forwarded onto the micro-flow recognizer 520.

The micro-flow recognizer 520 receives the pointers from the network trunk line interface 510 and retrieves the network layer and transport layer information from the stored data packet and searches 620 for a flow block that corresponds to the retrieved layer information. In one embodiment, the identification of the flow block is achieved by generating a hash key with the network layer and transport layer information by parallel hashing and transmitting the hash key though a non-linear shift register. In alternative embodiments, a content addressable memory ("CAM") or a binary tree search mechanism that also processes multiple data packets in parallel can be used to determine whether a flow block corresponding to the retrieved layers information is within the flow block table 570.

To determine whether the flow block already exists, the micro-flow recognizer 520 searches the flow block table 570 for the specific flow block that should correspond to the layers information. Each flow block includes state-based QoS descriptors corresponding to a unique micro-flow that previously was calculated by the linecard 410.

If the micro-flow classifier 530 identifies a flow block in the flow block table 570, the micro-flow recognizer 520 triggers the micro-flow classifier 530 to retrieve 630 the QoS descriptors and path information from the identified flow block. The micro-flow recognizer 520 then stores the QoS descriptors and path information along with the label information associated with the flow block within the storage block that corresponds to the retrieved layer information.

Figure 7:
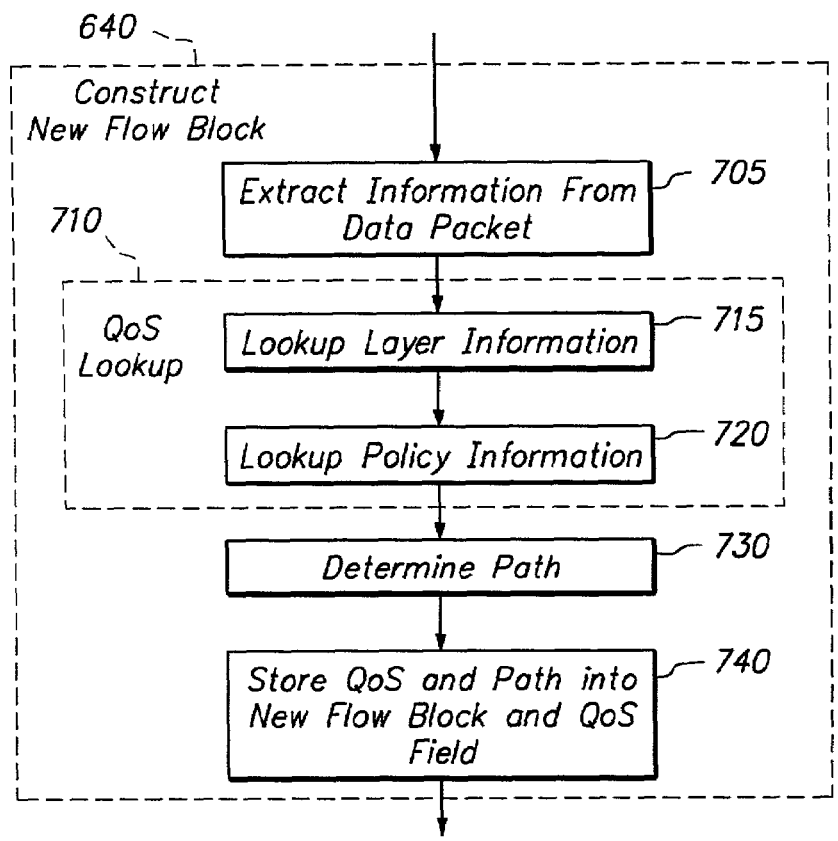
FIG. 7 illustrates a more detailed flow diagram of a method for generating a flow block corresponding to a micro-flow of an embodiment of the present invention.
Figure 8:
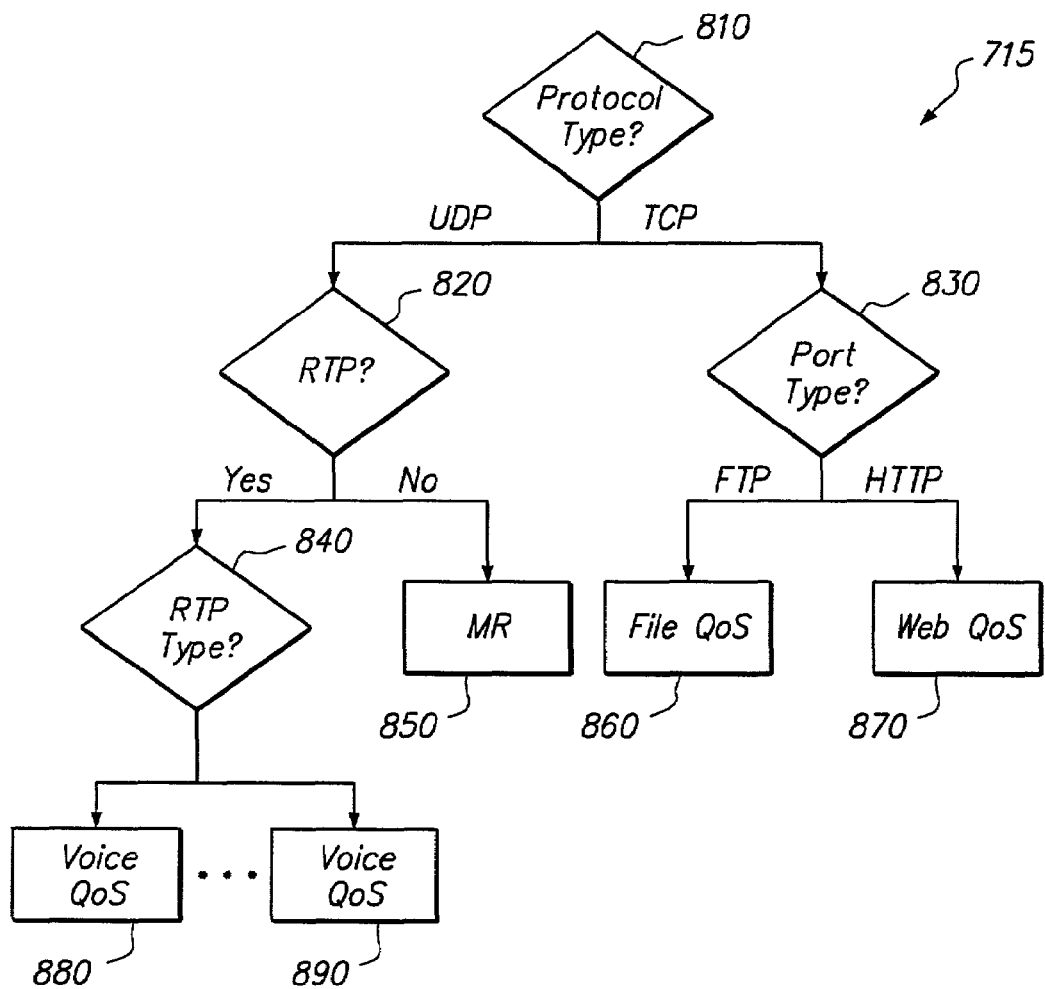
FIG. 8 illustrates a more detailed flow diagram of a method for determining quality of service descriptor values for a flow block corresponding to a micro-flow of an embodiment of the present invention.

If the micro-flow recognizer 520 fails to identify a flow block in the flow block table 570, the micro-flow recognizer 520 constructs 640 a new flow block with a new label corresponding to the layer information. The micro-flow recognizer 520 then transmits a pointer corresponding to the storage block associated with the received data packet. As illustrated in FIG. 7, the micro-flow classifier 530 utilizes this pointer to extract 705 layer information (e.g., physical layer information, link layer information, network layer information and transport layer information) as well as policy information from the data packet stored within the corresponding storage block. The micro-flow classifier 530 utilizes this extracted layer information to determine 710 QoS descriptor values that are to be associated with the flow block corresponding to the received data packet. In particular, the micro-flow classifier 715 can perform a coarse lookup 715 of QoS descriptors that specifically corresponds to the characteristics of the extracted layer information. For example, as illustrated in FIG. 8, one embodiment of the micro-flow classifier 530 analyzes the layer information to determine 810 a protocol type associated with the analyzed data packet. If the protocol type is TCP, the micro-flow classifier 530 then determines 830 the port type for the data packet. If the protocol port type is the file transfer protocol ("FTP"), the micro-flow classifier 530 retrieves 860 QoS descriptor values from the layers table 590 that are associated with a file-based set of QoS descriptor values (e.g., the Q value 360 is large and the D value 315 is approximately 0.5 seconds). If the protocol type is the hypertext transfer protocol ("HTTP"), the micro-flow classifier 530 retrieves 870 QoS descriptors from the layers table 590 that are associated with a web-based set of QoS descriptor values (e.g., the Q value 360 is a modest value and the D value 315 is approximately 0.25 seconds). Alternatively, if the protocol type is UDP, the micro-flow classifier 530 determines 820 whether the UDP includes RTP. If RTP is not identified, the micro-flow classifier 530 retrieves 850 QoS descriptor values from the layers table 590 which are associated with a maximum rate ("MR")-based set of QoS descriptor values. If RTP is identified, the RTP type is determined 840. If the RTP type is voice, the micro-flow classifier 530 retrieves 880 QoS descriptor values from the layers table 590 which are associated with a voice-based set of QoS descriptor values (e.g., a Q value 360 is a small value and the D value 315 is approximately 50 milliseconds). If the RTP type is some other type, such as video 890, the micro-flow classifier 530 retrieves 890 QoS descriptor values from the layers table 590 which are associated with a video-based set of QoS descriptor values. It should be noted that these sets of QoS descriptor values from the layers table 590 are intended to be coarse values that can be predefined or dynamically calculated. In addition, it should be noted that this mechanism of determining QoS descriptor values is merely illustrative and alternative mechanisms for determining QoS descriptor values, such as on-the-fly calculations based upon certain layer and available network rate information.

After the micro-flow classifier 530 determines 715 the coarse QoS descriptor values for the new flow block, the micro-flow classifier 530 then can finely tune the values by using the extracted policy (e.g., service level agreement) information from the data packet to look up 720 more exact QoS descriptor values within the policy table 580. For example, if the user, who was responsible for transmitting the data packet, has chosen to pay additional money for a better QoS, the micro-flow classifier 530 may use policy information from the data packet to modify QoS descriptor values (e.g., increase the W value) to provide this specific user's data packet transmissions more stringent QoS constraints.

In addition to calculating QoS descriptor values for the new flow block, the micro-flow classifier 530 also determines 730 a destination and route for the new micro-flow. In particular, the micro-flow classifier 530 utilizes layer information from the data packet to retrieve from the forwarding table 595 a primary egress linecard ("CO") and a primary egress trunk destination ("PTO") to which the micro-flow data packets associated with the flow block will be transmitted within the switch 220. To ensure redundancy, the micro-flow classifier 530 also can retrieve from the forwarding table 595 based upon the layer information an alternative CO ("COA") and an alternative PTO ("PTA"). This alternative egress destination can be used should the primary destination (CO and PTO) be unavailable.

Since numerous CO (COA) and PTO (PTA) values typically are possible for each retrieved data packet layer information, a utilization monitor that is within the policing scheduler 540 and that operates in the background of all of the other processes, determines the most desirable CO (COA) and PTO (PTA) values based upon the best and second best ARPW value for each egress linecard 410C. In particular, the utilization monitor continuously monitors the egress linecards and determines the ARPW value for each egress linecard. Based upon this ARPW value, the utilization monitor updates the forwarding table 595 and the routing table 597 to reflect the preferred CO (COA) and PTO (PTA) values for specific layer information. It should be noted that the utilization monitor within the policing scheduler 540 can obtain the ARPW value by receiving a rate packet from the egress linecards which identifies the egress linecard 410C and the ARPW value associated with that egress linecard 410C. Unlike the conventional protocols (e.g., ATM and RSVP), the retrieval of the ARPW is not needed prior to the establishment of the desired CO (COA) and PTO (PTA). Rather, the ARPW value is used to monitor in the background the changing bandwidth characteristics of the network 200, which in turn assists each switch 220 in assisting the micro-flow classifier 530 to choose the most appropriate CO (COA) and PTO (PTA) values for each micro-flow.

Once the CO (COA) and PTO (PTA) values are determined, the micro-flow classifier 540 retrieves from the routing table 597 a primary route ("RT") and an alternative route ("RTA") that corresponds to the CO/PTO and COA/PTA values. These routing values, like the destination values, reflect the most efficient values for routing a micro-flow over the fabric to an egress linecard 410C. In particular, the RT/RTA values represent three specific characteristics. First, the RT/RTA values reflect the two least utilized paths through the fabric for the CO/PTO and COA/PTA values. Second, the RT/RTA values reflect paths with the least number of hops between the ingress linecard 410A and the egress linecard 410C. Third, the RT and RTA values typically are as diverse from one another as possible to ensure a high level of fault tolerance. These characteristics ensure that the two paths have the least number of physical fabric switch core components in common, thereby ensuring satisfactory redundancy that the micro-flow packets can be successfully and efficiently routed from the ingress linecard 410A to the egress linecard 410C within the QoS constraints associated with the micro-flow.

In one embodiment of the present invention, the ingress linecard 410A also views the RT value as representing a prioritized path for micro-flows that are classified as MR or GR traffic. Such a prioritization can ensure that the most direct route is used for these stricter rate and delay variation types of micro-flows. The RTA value, therefore, would be used by the ingress linecard 410A for micro-flows that have been categorized as AR traffic which are not as constrained by its QoS requirements. Once the QoS and path information have been determined, the micro-flow classifier 530 will store the QoS and path information within the new flow block and the storage block corresponding to the received data packet. In addition, the micro-flow classifier 530 will notate within the storage block if the storage block corresponds to a first micro-flow data packet which is to include a QoS field 310 in addition to the label field 305. Lastly, the micro-flow classifier 530 will forward a pointer to this storage block to the policing scheduler 540.

It should be noted that if the received data packet already is formatted as a micro-flow data packet, the data packet would include a label field 305 and a QoS field 310. If such a data packet is received by the ingress linecard 410A, the micro-flow recognizer 520 and the micro-flow classifier 530 would not have to extract typical layer information from the data packet to search for a flow block 620 or to construct 640 a new flow block. Rather, the micro-flow recognizer 520 could utilize the label information from the label field 305 to search the flow block table 570 for a matching flow block. If a flow block corresponding to the label did not already exist, the micro-flow recognizer 520 would create a new flow block and store the label within the new flow block. The micro-flow classifier 530 then merely would retrieve the QoS descriptors from the QoS field 310 of the first micro-flow data packet and store these values within the newly created flow block. All subsequent micro-flow data packets from this same micro-flow then would be able to provide the micro-flow recognizer 520 with its already calculated label and allow the micro-flow classifier 530 retrieve the appropriate QoS descriptors and path information.

Once the policing scheduler 540 receives the pointer to the storage blocks that are to be constructed, the policing scheduler 540 uses this pointer to analyze 642 the GR or AR value stored within the storage block. This rate value is used by the policing scheduler 540 to police the rate in which micro-flow data packets are being scheduled for transmission by the policing scheduler 540. If the data packets for a specific micro-flow are being received at a rate that exceeds 642 the GR or AR value assigned to this micro-flow, the policing scheduler 540 discards 647 the micro-flow data packet by discarding the pointer to the storage block that contains that micro-flow data packet. If the micro-flow data packet is not exceeding the assigned rate, the policing scheduler 540 then retrieves the data packets from the storage blocks and constructs 645 micro-flow data packets. If the micro-flow data packet is a first packet, the micro-flow data packet will include a label field 305 and a QoS field 310. If the packet is a subsequent packet, the micro-flow data packet will include the label field 305, but not the QoS field 310.

Upon construction 645 of the micro-flow data packets, the policing scheduler 540 begins metering 650 the transmission of these micro-flow data packets across the fabric of the switch core 430. In particular, the policing scheduler 540 is not strictly enforcing the actual bit rate for each micro-flow. Rather, the policing scheduler 540 attempts to schedule the transmission of the micro-flows across the fabric as fast as possible while at the same time ensuring that the data packets associated with each micro-flow are not misbehaving by attempting to exceed their assigned rates.

When the egress linecard 410C receives 610 the micro-flow data packet from the fabric, the micro-flow recognizer 535 within the egress micro-flow manager 507 will retrieve the label from the label field 305 and search 610 for whether a flow block within the flow block table 570 matches the label. If a flow block is identified, the micro-flow recognizer 535 retrieves 630 the QoS descriptors and path information from the identified flow block. If the label is not matched with a flow block, the micro-flow recognizer 535 constructs 640 a new flow block by retrieving the QoS descriptors from the QoS field 310 within the first micro-flow data packet. This new flow block is stored in the flow block table 570 in a similar manner to the procedure previously discussed. In addition, the micro-flow recognizer 535 also ensures that each micro-flow data packet also is stored within a storage block within the storage block table 560.

As similarly discussed above with regard to the policing scheduler 540, once the QoS scheduler 525 at the egress linecard 410C receives the pointer to the storage block for a micro-flow data packet, the QoS scheduler 525 is responsible for scheduling the transmission of the micro-flow data packet 650. Unlike the policing scheduler 540 within the ingress micro-flow manager 505, the QoS scheduler 525 of the egress miro-flow manager 507 analyzes the delay variation and rate values that are specifically associated with the micro-flow data packet to ensure that the micro-flow data packets are transmitted within the QoS constraints defined for that micro-flow. In particular, QoS scheduler 525 utilizes weighted fair queuing ("WFQ") techniques to assist in providing guarantees that the delay variation and rate for each micro-flow is maintained. Without state information, such efficient WFQ techniques would not be available to the QoS scheduler 525. Unlike the ingress micro-flow manager 505, which was attempting to police the incoming data packets through packet discards, the egress micro-flow manager 507 is focused upon ensuring that each micro-flow data packet is transmitted onto the trunk line at the specific rate and delay variation that was assigned to the micro-flow.

Figure 9:
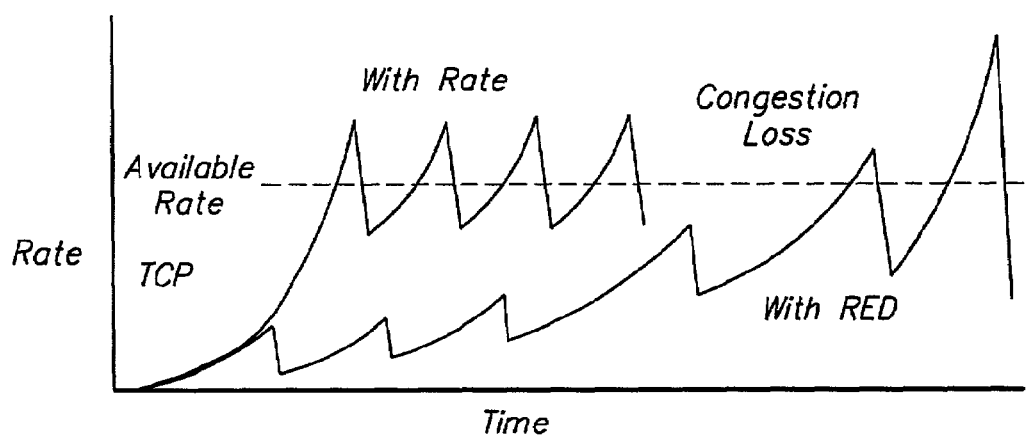
FIG. 9 is a graph that illustrates the difference between a transmission control protocol start up procedure within a convention network and a network of an embodiment of the present invention.

FIG. 9 illustrates one of the advantages of scheduling the transmission based upon enforcing the delay variation and rate characteristics of the micro-flow. For example, in utilizing the TCP start up procedure, a conventional network 100 would not be able to avoid the slow start-up associated with TCP. In particular, conventional implementations of TCP rely upon random early discards ("RED") to enable the TCP transmission to reach the available rate and not to create congestion that would result in unwanted loss in the transmission. In one embodiment of the present invention, by possessing rate information relating to the micro-flow, the TCP micro-flow can be directly increased to the available rate and only then begin to discard packets to avoid congestion loss problems. By avoiding RED, the micro-flow can rise to the available rate much quicker, thereby increasing the performance of the transmission. Such an increase in the performance of such micro-flows would not have been possible in a conventional network 100 because state information relating to rate would not have been available to the QoS scheduler 525.

Once the micro-flow data packet is ready to be transmitted from the egress linecard 410C, the QoS scheduler 525 triggers the forwarding of the micro-flow data packet that had been stored within a storage block, to the network trunk line interface 515. The network trunk line interface 515 can encapsulate (if needed) the data packets and transmit the data packet over the trunk line. In one embodiment of the present invention, the network trunk line interface 515 can encapsulate micro-flow data packets into various types of formats including different physical layers (e.g., SONET or Gigabit Ethernet) as well as various link layers (e.g., MPLS, IPv4, IPv6 or ATM). In addition, if the switch 220 is at the edge of a network, the label field 305 and the QoS field 310 also can be stripped out from the data packet to ensure proper reformatting of the data packet.

While the present invention has been particularly shown and described with reference to various embodiments relating to network 200, it should be noted that various changes in form and details can be made therein without departing from the spirit and scope of the invention. For example, micro-flows can be used with unicast as well as multi-cast data traffic. Micro-flows also can include additional QoS characteristics in the form of additional QoS descriptors within each flow block corresponding to each micro-flow.

What is claimed is:

1. A routing method, comprising:
   receiving a set of information associated with a particular flow;
   accessing a flow data structure associated with said particular flow, said flow data structure comprising an indication of a specific route that sets of information associated with said particular flow should traverse to arrive at a particular egress;
   sending said set of information to said particular egress via said specific route;
   receiving a second set of information which is also associated with said particular flow;
   accessing said flow data structure to obtain said indication of said specific route; and
   sending said second set of information to said particular egress via said specific route.

2. The method of claim 1, wherein said specific route represents a complete path to said particular egress.

3. The method of claim 1, wherein said flow data structure is not associated with any other flow.

4. The method of claim 1, wherein said indication comprises a reference to a routing table.

5. The method of claim 1, wherein said flow data structure further comprises an identifier for said particular egress.

6. The method of claim 1, wherein said flow data structure further comprises an indication of an alternate route that sets of information associated with said particular flow may traverse to arrive at an alternate egress.

7. The method of claim 6, where said flow data structure further comprises an identifier for said alternate egress.

8. The method of claim 1, wherein said set of information comprises an information packet.

9. The method of claim 8, wherein said information packet is an internet protocol (IP) packet.

10. The method of claim 9, wherein said particular flow comprises a plurality of information packets.

11. A routing method, comprising:
    maintaining a plurality of flow data structures, each flow data structure associated with a corresponding flow, said each flow data structure comprising an indication of a specific route that sets of information associated with a corresponding flow should traverse to arrive at an egress, and further comprising:
    receiving a set of information associated with a new flow, said new flow destined for a particular egress,
    determining a least utilized route to said particular egress, and
    storing an indication of said least utilized route in a new flow data structure associated with said new flow to cause future sets of information associated with said new flow to be sent to said particular egress via said least utilized route; and
    using said plurality of flow data structures to route sets of information through a router.

12. The method of claim 11, wherein said each flow data structure further comprises an identifier for a particular egress.

13. The method of claim 11, wherein said each flow data structure further comprises an indication of an alternate route that sets of information associated with a corresponding flow may traverse to arrive at an alternate egress.

14. The method of claim 13, wherein said each flow data structure further comprises an identifier for said alternate egress.

15. The method of claim 11, wherein said each flow data structure further comprises quality of service (QoS) parameters for a corresponding flow.

16. The method of claim 11, wherein said indication comprises a reference to a routing table.

17. The method of claim 11, wherein at least one of said corresponding flows comprises a plurality of sets of information.

18. The method of claim 17, wherein each set of information comprises an information packet.

19. The method of claim 18, wherein said information packet is an internet protocol (IP) packet.

20. A routing method implemented within a router, comprising:
    receiving, at an ingress of a router, a set of information associated with a particular flow;
    accessing a flow data structure associated with said particular flow, said flow data structure comprising an indication of a specific route through the router that sets of information associated with said particular flow should traverse to arrive at a particular egress;
    sending said set of information to said particular egress via said specific route;
    receiving a second set of information which is also associated with said particular flow;
    accessing said flow data structure to obtain said indication of said specific route; and
    sending said second set of information to said particular egress via said specific route.

21. The method of claim 20, wherein said flow data structure is not associated with any other flow.

22. The method of claim 20, wherein said specific route represents a complete path between said ingress and said particular egress through a switching fabric in the router.

23. The method of claim 20, wherein said indication comprises a reference to a routing table.

24. The method of claim 20, wherein said particular flow comprises a plurality of sets of information.

25. The method of claim 24, wherein each set of information comprises an information packet.

26. The method of claim 25, wherein said information packet is an internet protocol (IP) packet.

27. A routing method, comprising:
  receiving a first set of information associated with a first flow;
  accessing a first flow data structure associated with said first flow, said first flow data structure comprising an indication of a first specific route that sets of information associated with said first flow should traverse to arrive at a first particular egress;
  sending said first set of information to said first particular egress via said first specific route;
  receiving a second set of information associated with a second flow;
  accessing a second flow data structure associated with said second flow, said second flow data structure comprising an indication of a second specific route that sets of information associated with said second particular flow should traverse to arrive at a second particular egress; and
  sending said second set of information to said second particular egress via said second specific route;
  wherein said first flow data structure and said second flow data structure are distinct.

28. The method of claim 27, wherein said first specific route and said second specific route may be the same route.

29. The method of claim 27, wherein said first specific route and said second specific route are different routes.

30. The method of claim 27, wherein said first particular egress and said second particular egress may be the same egress.

31. The method of claim 27, wherein said first particular egress and said second particular point are different egresses.

32. An apparatus, comprising:
  a storage for storing a plurality of flow data structures, each flow data structure associated with a corresponding flow, said each flow data structure comprising an indication of a specific route that sets of information associated with a corresponding flow should traverse to arrive at an egress; and
  a flow manager coupled to said storage, said flow manager maintaining said plurality of flow data structures, and using said flow data structures to route sets of information through a router, wherein said flow manager, upon receiving a set of information associated with a particular flow, accesses from said storage a particular flow data structure that is associated with said particular flow, and obtains therefrom an indication of a particular specific route that sets of information associated with said particular flow should traverse to arrive at a particular egress, said flow manager sending said set of information to said particular egress via said particular specific route.

33. The apparatus of claim 32, wherein said particular specific route represents a complete path to said particular egress.

34. The apparatus of claim 32, wherein said flow manager sends said set of information to said particular egress by augmenting said set of information to include said particular specific route, and sending the augmented set of information into a switching core to be routed to said particular egress via said particular specific route.

35. The apparatus of claim 32, wherein said flow manager receives a second set of information associated with said particular flow, and accesses from said storage said particular flow data structure associated with said particular flow to obtain therefrom the indication of said particular specific route, said flow manager sending said second set of information to said particular egress via said particular specific route.

36. The apparatus of claim 32, wherein said storage further stores a routing table, and wherein said indication comprises a reference to said routing table.

37. The apparatus of claim 32, wherein said each flow data structure further comprises an identifier for a particular egress.

38. The apparatus of claim 32, wherein said each flow data structure further comprises an indication of an alternate route that sets of information associated with a corresponding flow may traverse arrive at an alternate egress.

39. The apparatus of claim 38, wherein said each flow data structure further comprises an identifier for said alternate egress.

40. The apparatus of claim 32, wherein said each flow data structure further comprises quality of service (QoS) parameters for a corresponding flow.

41. The apparatus of claim 32, wherein at least one of said corresponding flows comprises a plurality of sets of information.

42. The apparatus of claim 41, wherein each set of information comprises an information packet.

43. The apparatus of claim 42, wherein said information packet is an internet protocol (IP) packet.

44. The apparatus of claim 32, wherein said flow manager:
  receives a set of information associated with a new flow, said new flow destined for a particular egress, said flow manager determining a least utilized route to said particular egress, and storing an indication of said least utilized route in a new flow data structure associated with said new flow in said storage, said new flow data structure causing future sets of information associated with said new flow to be sent to said particular egress via said least utilized route.

45. The apparatus of claim 32, wherein said apparatus is implemented in an ingress linecard of a router.

46. A router, comprising:
  an ingress device;
  a first egress device; and
  a switching core interconnecting said ingress device with said first egress device to provide a plurality of possible routes between said ingress device and said first egress device,
  wherein said ingress device receives a first set of information associated with a first flow, and accesses a first flow data structure associated with said first flow, said first flow data structure comprising an indication of a first specific route through said switching core that sets of information associated with said first flow should traverse to arrive at said first egress device, said ingress device sending said first set of information to said first egress device via said first specific route, and further receives another set of information which is also associated with said first flow, and accesses said first flow data structure to obtain therefrom said indication of said first specific route, said ingress device sending said other set of information to said first egress device via said first specific route.

47. The router of claim 46, wherein said first flow data structure is not associated with any other flow.

48. The router of claim 46, wherein said ingress device receives a second set of information associated with a second flow, and accesses a second flow data structure associated with said second flow, said second flow data structure comprising an indication of a second specific route through said switching core that sets of information associated with said second flow should traverse to arrive at said first egress device, said ingress device sending said second set of information to said first egress device via said second specific route, and wherein said first data flow structure and said second data flow structure are distinct.

49. The router of claim 46, wherein said router further comprises a second egress device, wherein said switching core interconnects said ingress device with said second egress device to provide a plurality of possible routes between said ingress device and said second egress device, and wherein said ingress device receives a second set of information associated with a second flow, and accesses a second flow data structure associated with said second flow, said second flow data structure comprising an indication of a second specific route through said switching core that sets of information associated with said second flow should traverse to arrive at said second egress device, said ingress device sending said second set of information to said second egress device via said second specific route, and wherein said first data flow structure and said second data flow structure are distinct.

50. A router, comprising:
an ingress device;
a first egress device; and
a switching core interconnecting said ingress device with said first egress device to provide a plurality of possible routes between said ingress device and said first egress device,
wherein said ingress device receives a first set of information associated with a first flow, and accesses a first flow data structure associated with said first flow, said first flow data structure comprising an indication of a first specific route through said switching core that sets of information associated with said first flow should traverse to arrive at said first egress device, said ingress device sending said first set of information to said first egress device via said first specific route,
wherein said ingress device receives a second set of information associated with a second flow, and accesses a second flow data structure associated with said second flow, said second flow data structure comprising an indication of a second specific route through said switching core that sets of information associated with said second flow should traverse to arrive at said first egress device, said ingress device sending said second set of information to said first egress device via said second specific route, and
wherein said first data flow structure and said second data flow structure are distinct.

51. The router of claim 50, wherein said first flow data structure is not associated with any other flow.

52. A router, comprising:
an ingress device;
a first egress device; and
a switching core interconnecting said ingress device with said first egress device to provide a plurality of possible routes between said ingress device and said first egress device,
wherein said ingress device receives a first set of information associated with a first flow, and accesses a first flow data structure associated with said first flow, said first flow data structure comprising an indication of a first specific route through said switching core that sets of information associated with said first flow should traverse to arrive at said first egress device, said ingress device sending said first set of information to said first egress device via said first specific route,
wherein said router further comprises a second egress device, wherein said switching core interconnects said ingress device with said second egress device to provide a plurality of possible routes between said ingress device and said second egress device, and wherein said ingress device receives a second set of information associated with a second flow, and accesses a second flow data structure associated with said second flow, said second flow data structure comprising an indication of a second specific route through said switching core that sets of information associated with said second flow should traverse to arrive at said second egress device, said ingress device sending said second set of information to said second egress device via said second specific route, and
wherein said first data flow structure and said second data flow structure are distinct.

53. The router of claim 52, wherein said first flow data structure is not associated with any other flow.

* * * * *